March 27, 1934.  I. LANGMUIR  1,952,927
FURNACE
Original Filed July 30, 1924
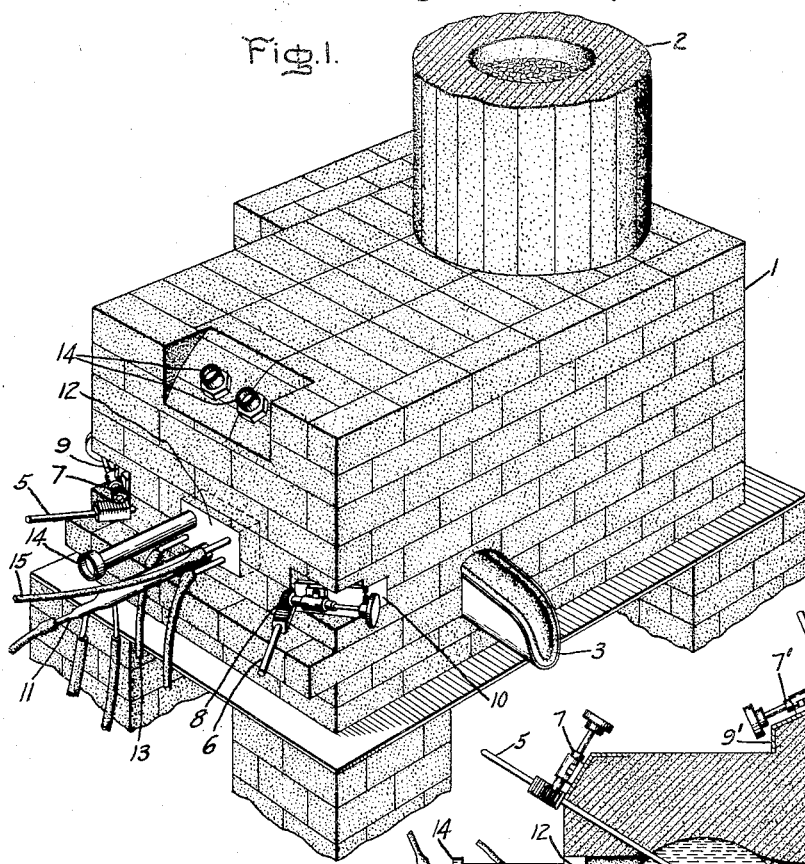
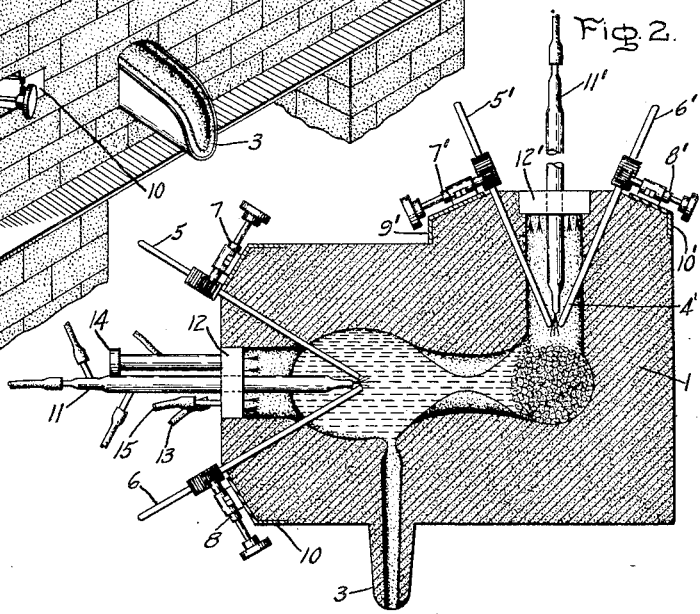
Inventor:
Irving Langmuir,
by Charles E. Tullar
His Attorney.

Patented Mar. 27, 1934

1,952,927

UNITED STATES PATENT OFFICE 1,952,927

FURNACE

Irving Langmuir, Schenectady, N. Y., assignor to General Electric Company, a corporation of New York Original application July 30, 1924, Serial No. 729,185. Divided and this application June 17, 1929, Serial No. 371,316

2 Claims. (Cl. 13—2)

The present application is a division of my earlier application Serial No. 729,185 for heating process and apparatus, filed July 30, 1924, in which is described and broadly claimed a new method and apparatus for carrying out technical operations requiring high temperatures, such, for example, as the fusion of metals.

In the practice of my invention the thermal dissociation of hydrogen at high temperatures to form what I call "atomic hydrogen" in my papers published in the Journal of the American Chemical Society Vol. 36 (1914) page 1708 and Vol. 37 (1915) page 417, is utilized for industrial heating and metallurgical operations.

The dissociation of the ordinary form of molecular hydrogen to atomic hydrogen consumes or renders latent a relatively large amount of heat which is again liberated when the atomic hydrogen is returned back to its molecular state.

In accordance with my invention I provide furnaces for carrying out heating operations wherein the latent heat of dissociation of hydrogen is utilized to convey heat efficiently from a heat source such as an arc to the work to be heated.

In one aspect the conversion of molecular hydrogen at the source of heat into atomic hydrogen and the utilization of atomic hydrogen for heating the work is comparable to the conversion of water to steam and the utilization of the steam for heating accomplished by its condensation to water. The active reducing character of atomic hydrogen, however, is a new property for which no analogy exists in the case of steam and which renders atomic hydrogen as a source of heat of peculiar advantage in heating and fusing processes in which oxidation should be avoided.

In one aspect my invention comprises a furnace applicable to the fusion of metals wherein the dissociation of hydrogen is carried out by an electric arc, and atomic hydrogen is conveyed to the work by a current or blast of molecular hydrogen. Such a furnace may be utilized for heating a charge which, because of its bulky nature, is not readily susceptible to being heated efficiently by an ordinary arc. Metal scrap, for example, may be melted advantageously in a furnace embodying my invention. Heating by atomic hydrogen also may be utilized for purposes other than fusion.

Other novel features of my invention will be described in the following specification and pointed out with particularity in the appended claims.

In the accompanying drawing, Fig. 1 shows in perspective a scrap melting furnace embodying my invention; and Fig. 2 is a horizontal section of the same furnace.

The furnace shown somewhat diagrammatically in Figs. 1 and 2 may consist of fire-bricks and comprise a fusion chamber 1 and a stack 2, into which scrap iron or other material to be melted is charged. The stack, to advantage, may widen or flare somewhat as it joins the fusion chamber.

The drawing shows two sets of heaters or torches projecting into the furnace, but, of course, only one heater or a larger number may be used according to circumstances. One heater projects into the fusion chamber 1 where the molten metal accumulates and from which it is discharged by a spout 3 and the other heater projects into a horizontal passage 4, leading to the stack 2. Although both heaters cooperate to fuse the charge, the heater projecting into the fusion chamber mainly serves to heat the collected molten material above its melting point.

The apparatus illustrated whereby hydrogen is dissociated comprises arc-supporting electrodes 5, 6, held in hand-operated regulating devices 7, 8, which in turn are supported upon plates 9, 10 set into the wall of the furnace. A stream of hydrogen, preferably dried hydrogen, is directed through an arc being operated between these electrodes and passes from the arc into contact with the work. The hydrogen is supplied by a water-cooled tube 11 which projects through a base 12 containing ducts (not shown) supplied with water or other cooling fluid by the tubes 13. The other hydrogen torch, being similar in construction, has been indicated by the same reference numerals primed. The hydrogen supply tube 11 preferably is tipped with a nozzle of molybdenum or other refractory metal. A sight tube 14 may be provided to assist in regulating the arc.

The electrodes may consist of highly refractory metal as, for example, tungsten. When an arc is operated between the electrodes, the stream of ordinary molecular hydrogen passing into contact with the arc is dissociated into atomic hydrogen, the dissociation being accompanied by the absorption of heat from the arc. With an input of about 25 kilowatts and electrodes of about ⅜" in diameter, separated about ⅛ to ¼", an arc voltage of about 100 volts can be used. The arc is bowed out by the hydrogen blast. Much higher energy arcs and greater lengths of arc can be used. For most commercial uses furnaces of greater power running into hundreds of kilowatts are preferable. The arcs may be operated with either direct or alternating current. In the former case a series resistance is necessary. In the latter case a series reactance can be used or the energy may be derived from a constant current transformer.

The arc assumes in hydrogen at atmospheric pressure or at higher pressures a concentrated form, and operates at relatively high voltage. By blowing the arc outwardly by a transverse blast of hydrogen the operating voltage may be raised to 600 volts or higher values. The electrodes remain substantially intact, or, in other words, are not consumed by the arc.

Experiments indicate that the heat rendered latent by the dissociation of one gram of hydrogen is about 42,000 calories. As this latent heat of dissociation is set free when the atomic hydrogen again combines or "burns" to form ordinary hydrogen after having left the arc, this relatively large amount of heat is set free and is conveyed to the work. The dissociation of the hydrogen efficiently carries heat from the arc to the work, in this case represented by the metal scrap, which has a relatively large mass, whereas an electric arc when playing directly upon the work would heat only local parts of the mass. The hydrogen also maintains a reducing atmosphere, thereby preventing oxidation of the material being melted. Low pressure bathing hydrogen may be supplied to the interior of the furnace by a conduit 15.

While I have shown and described a particular embodiment of my invention, such modifications and variations are contemplated as fall within the scope of my invention which is set forth in the appended claims.

What I claim as new and desire to secure by Letters Patent of the United States, is:

1. An electric furnace having in combination, a heating chamber, electrodes and means for maintaining an electric arc between them, a source of hydrogen, means for sending a current of hydrogen from said source past said arc so as to dissociate the hydrogen into its atomic state and for delivering said dissociated hydrogen directly from said arc onto the contents of the heating chamber without contact with the walls of said chamber or any inlet passage.

2. An electric furnace having in combination, a heating chamber, tungsten electrodes and means for maintaining between them a high power electric arc, a source of hydrogen, means for sending a current of hydrogen from said source past said arc so as to dissociate the hydrogen into atomic hydrogen and for delivering said dissociated hydrogen directly from said arc onto the contents of the heating chamber without contact with the walls of said chamber or any inlet passage.

IRVING LANGMUIR.

CERTIFICATE OF CORRECTION.

Patent No. 1,952,927.　　　　　　　　　　　　　　　　March 27, 1934.

IRVING LANGMUIR.

It is hereby certified that error appears in the printed specification of the above numbered patent requiring correction as follows: Page 1, line 30, for "accomplished" read accompanied; and line 59, for "fire-bricks" read fire-brick; and that the said Letters Patent should be read with these corrections therein that the same may conform to the record of the case in the Patent Office.

Signed and sealed this 15th day of May, A. D. 1934.

Bryan M. Battey (Seal)　　　　　　　　　　　　　　　　Acting Commissioner of Patents.